(12) United States Patent
Onishi et al.

(10) Patent No.: US 11,599,957 B2
(45) Date of Patent: Mar. 7, 2023

(54) CONSTRUCTION SITE MANAGEMENT DEVICE, OUTPUT DEVICE, AND CONSTRUCTION SITE MANAGEMENT METHOD

(71) Applicant: Komatsu Ltd., Tokyo (JP)

(72) Inventors: Yoshiyuki Onishi, Tokyo (JP); Shinya Kanou, Tokyo (JP); Kyohei Kuroda, Tokyo (JP); Shota Furukawa, Tokyo (JP); Naoyuki Omuro, Tokyo (JP)

(73) Assignee: Komatsu Ltd., Tokyo (JP)

( * ) Notice: Subject to any disclaimer, the term of this patent is extended or adjusted under 35 U.S.C. 154(b) by 499 days.

(21) Appl. No.: 16/607,115

(22) PCT Filed: Jun. 27, 2018

(86) PCT No.: PCT/JP2018/024400
§ 371 (c)(1),
(2) Date: Oct. 22, 2019

(87) PCT Pub. No.: WO2019/017173
PCT Pub. Date: Jan. 24, 2019

(65) Prior Publication Data
US 2020/0380620 A1 Dec. 3, 2020

(30) Foreign Application Priority Data
Jul. 18, 2017 (JP) .............................. JP2017-139408

(51) Int. Cl.
*G06Q 50/08* (2012.01)
*G06Q 10/06* (2012.01)
(Continued)

(52) U.S. Cl.
CPC ....... *G06Q 50/08* (2013.01); *G06Q 10/06395* (2013.01); *G07C 5/02* (2013.01);
(Continued)

(58) Field of Classification Search
USPC .......................................................... 701/102
See application file for complete search history.

(56) References Cited

U.S. PATENT DOCUMENTS

2006/0173619 A1* 8/2006 Brant .................. G01S 5/02
701/50
2013/0103271 A1* 4/2013 Best .................. G01S 13/02
701/50
(Continued)

FOREIGN PATENT DOCUMENTS

JP 2009-076104 A 4/2009
JP 2009-199443 A 9/2009
(Continued)

Primary Examiner — Tyler D Paige
(74) Attorney, Agent, or Firm — Locke Lord LLP

(57) ABSTRACT

The work state identifying unit identifies a work state of a work machine disposed in a construction site at each time point and a work state of a transport vehicle traveling at the construction site at each time point. The time chart generation unit that generates a time chart representing the work state of the work machine at each time point and a time chart representing the work state of the transport vehicle at each time point on the basis of the identified work states. The output control unit that outputs the time charts on an identical screen with a time axis as a common axis.

17 Claims, 13 Drawing Sheets

(51) Int. Cl.
  *G07C 5/02*     (2006.01)
  *G07C 5/04*     (2006.01)
  *G07C 5/06*     (2006.01)
  *G06Q 10/0639*  (2023.01)
  *G07C 5/12*     (2006.01)

(52) U.S. Cl.
  CPC ................ *G07C 5/04* (2013.01); *G07C 5/06* (2013.01); *G07C 5/12* (2013.01)

(56) References Cited

U.S. PATENT DOCUMENTS

| | | | |
|---|---|---|---|
| 2015/0032373 A1* | 1/2015 | Ikari | G08G 1/123 |
| | | | 73/146 |
| 2016/0017574 A1 | 1/2016 | Adachi et al. | |
| 2016/0217398 A1* | 7/2016 | Unuma | G06Q 10/06 |
| 2017/0286911 A1* | 10/2017 | Randle, II | G06Q 50/08 |
| 2018/0151070 A1* | 5/2018 | Katou | G06Q 50/30 |
| 2020/0380620 A1 | 12/2020 | Onishi et al. | |

FOREIGN PATENT DOCUMENTS

| | | |
|---|---|---|
| JP | 2010-073031 A | 4/2010 |
| JP | 2012-132181 A | 7/2012 |
| JP | 2014-237505 A | 12/2014 |
| JP | 2015-535992 A | 12/2015 |
| JP | 2017-004347 A | 1/2017 |
| WO | 2014/047641 A1 | 3/2014 |
| WO | 2014/136956 A1 | 9/2014 |
| WO | 2015/037064 A1 | 3/2015 |
| WO | 2019/017173 A1 | 1/2019 |

\* cited by examiner

| WORK MACHINE ID | RECEPTION TIME | POSITION DATA | AZIMUTH DATA |
|---|---|---|---|
| | | | |
| | | | |
| | | | |

CONSTRUCTION SITE MANAGEMENT DEVICE, OUTPUT DEVICE, AND CONSTRUCTION SITE MANAGEMENT METHOD

TECHNICAL FIELD

The present invention relates to a construction site management device, an output device, and a construction site management method.

Priority is claimed on Japanese Patent Application No. 2017-139408 filed on Jul. 18, 2017, the content of which is incorporated herein by reference.

BACKGROUND ART

PTL 1 discloses a technique of generating a time chart representing traveling progress of a plurality of transport vehicles.

CITATION LIST

Patent Literature

[PTL 1] Published Japanese Translation No. 2015-535992 of the PCT International Publication

SUMMARY OF INVENTION

Technical Problem

A transport vehicle transporting earth and sand and a work machine performing earth cut work or banking work are disposed at a construction site. In other words, at the construction site, a group including a combination of one or more transport vehicles and work machines performing loading work on the transport vehicles, a so-called fleet is formed. At the construction site, in light of efficiency of the entire fleet including the transport vehicles and the work machines, there is a desire to examine an appropriate number of transport vehicles and work machines. Therefore, in order to consider the efficiency of the fleet, there is a desire to easily recognize work of the transport vehicles and the work machines forming the fleet. According to the time chart disclosed in PTL 1, the traveling progress of a plurality of transport vehicles is displayed, but a state of a work machine forming the fleet may not be recognized, and the efficiency of the entire fleet may not read from the time chart.

Aspects of the present invention are directed to providing a construction site management device, an output device, and a construction site management method capable of easily recognizing a work state of a fleet including a transport vehicle and a work machine.

Solution to Problem

According to a first aspect, there is provided a construction site management device including a work state identifying unit that identifies a work state of a work machine disposed in a construction site at each time point and a work state of a transport vehicle traveling at the construction site at each time point; a time chart generation unit that generates a time chart representing the work state of the work machine at each time point and a time chart representing the work state of the transport vehicle at each time point on the basis of the identified work states; and an output control unit that outputs the time chart representing the work state of the work machine at each time point and the time chart representing the work state of the transport vehicle at each time point on an identical screen with a time axis as a common axis.

Advantageous Effects of Invention

According to the aspects, the construction site management device enables a work state of a fleet including a transport vehicle and a work machine to be easily recognized.

DESCRIPTION OF EMBODIMENTS

First Embodiment

<<Construction Site>>

Figure 1:
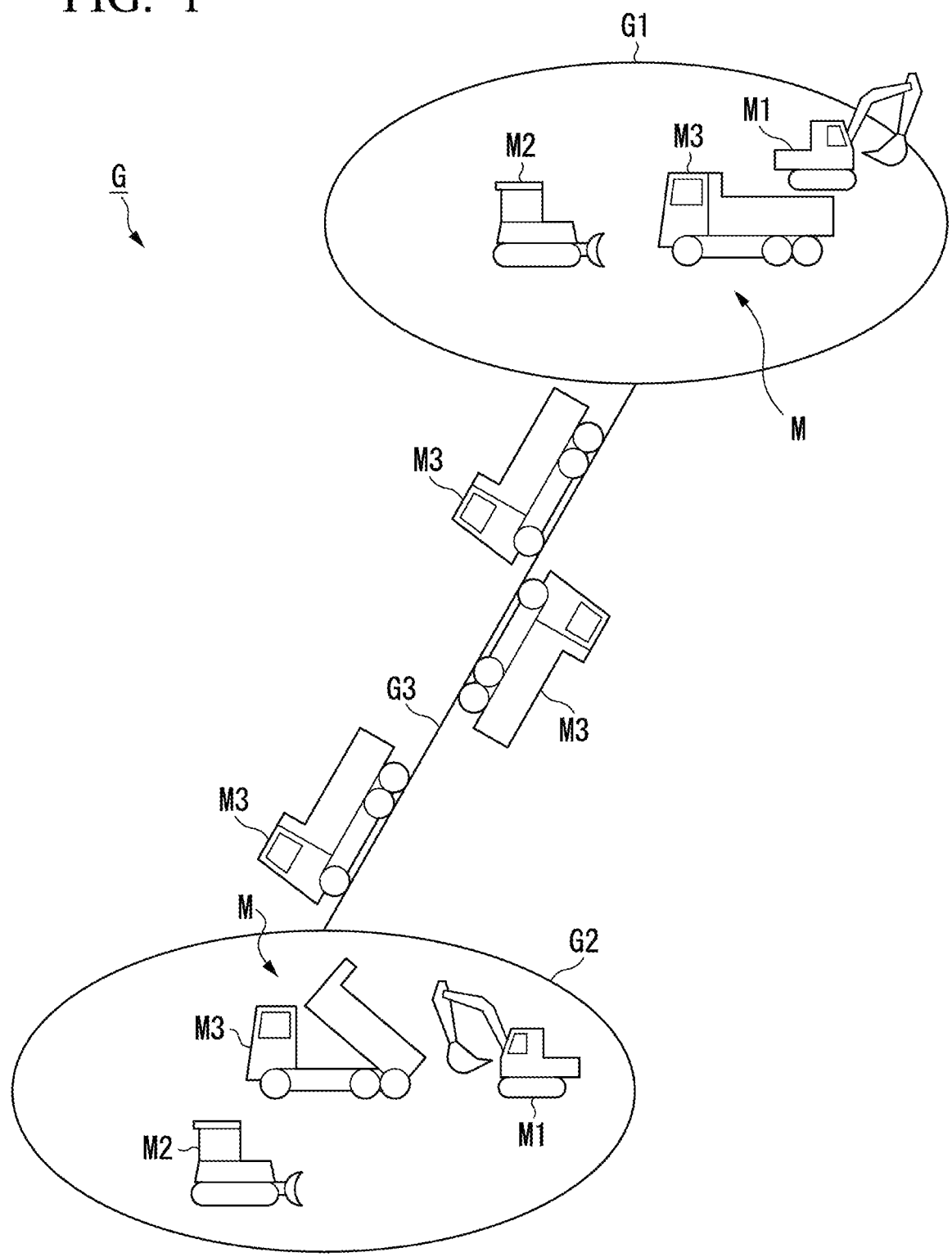
FIG. 1 is a diagram showing an example of a construction site which is a management target of a construction site management device according to a first embodiment.

FIG. 1 is a diagram showing an example of a construction site which is a management target of a construction site management device according to a first embodiment.

A construction site G according to the first embodiment has an earth cut location G1 and a banking location G2. The earth cut location G1 and the banking location G2 are connected to each other via a traveling path G3. The traveling path G3 includes a general road connecting the earth cut location G1 to the banking location G2, and a transport path for transport of earth and sand prepared at the construction site G. A hydraulic excavator M1 and a bulldozer M2 are disposed in each of the earth cut location G1 and the banking location G2. The hydraulic excavator M1 and the bulldozer M2 are examples of work machines performing work related to earth and sand at the construction site G. A plurality of dump trucks M3 travel between the earth cut location G1 and the banking location G2. The dump truck M3 is an example of a transport vehicle transporting earth and sand. The hydraulic excavator M1, the bulldozer M2, and the dump truck M3 are examples of a vehicle M. In other embodiments, in the earth cut location G1 and the banking location G2, a plurality of hydraulic excavators M1 may be disposed, a plurality of bulldozers M2 may be disposed, one of the hydraulic excavator M1 or the bulldozer M2 may not be disposed, and other vehicles M may be disposed. The number of transport vehicles disposed at the construction site G is larger than the number of work machines.

<<Vehicle>>

The hydraulic excavator M1 disposed in the earth cut location G1 excavates earth and sand in the earth cut location G1, and loads the earth and sand onto the dump truck M3.

Figure 2:
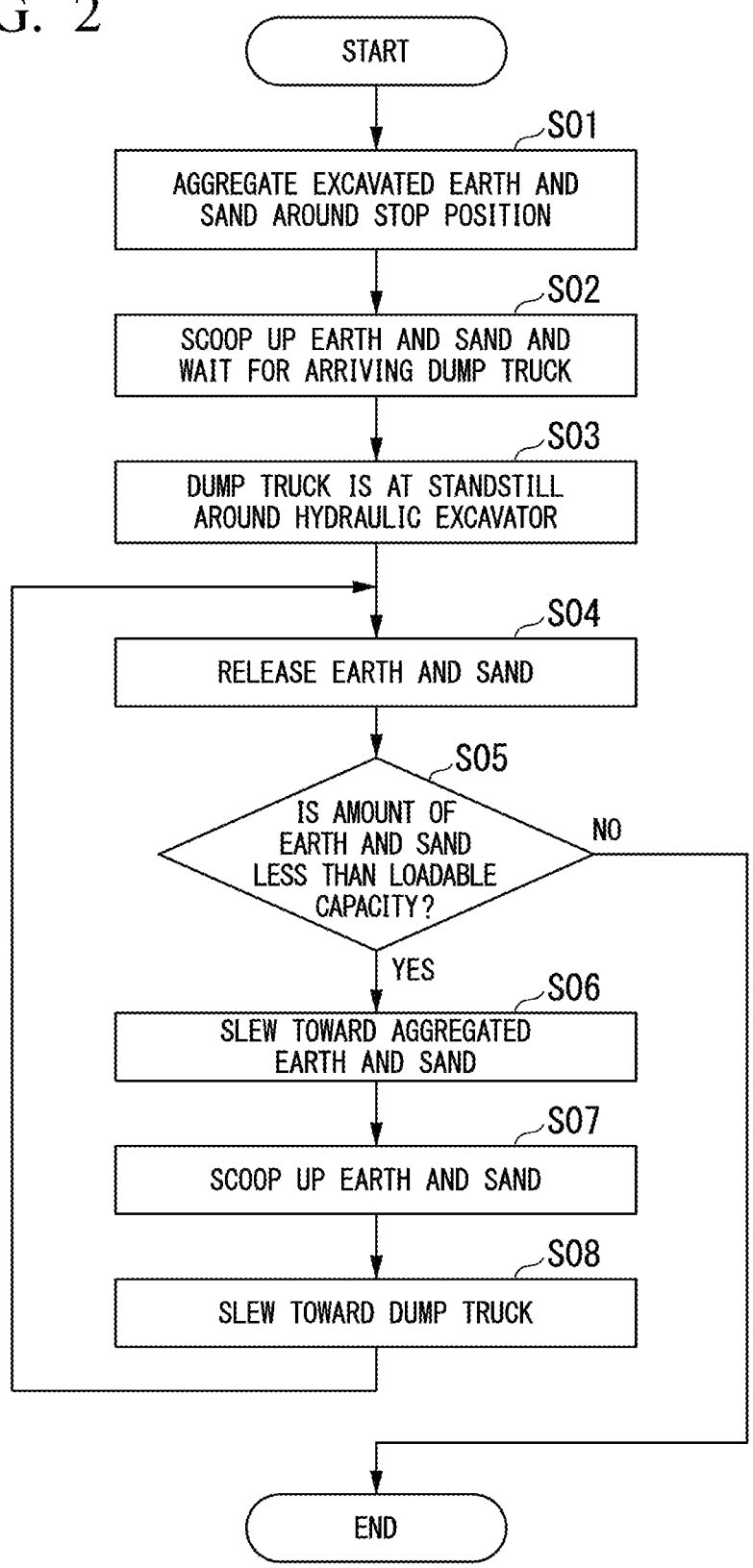
FIG. 2 is a flowchart showing an operation of loading work of a hydraulic excavator.

FIG. 2 is a flowchart showing an operation of loading work of the hydraulic excavator.

An operator of the hydraulic excavator M1 aggregates excavated earth and sand around a standstill position of the dump truck M3 in advance before the dump truck M3 arrives (step S01). The operator of the hydraulic excavator M1 scoops up a bucket of earth and sand with the hydraulic excavator M1 before the dump truck M3 arrives (step S02). In a case where there is no margin in work time, the work in steps S01 and S02 may be omitted. In a case where the dump truck M3 reaches a predetermined loading region of the earth cut location G1, the dump truck M3 is at a standstill around the hydraulic excavator M1 (step S03). Next, the operator of the hydraulic excavator M1 releases the scooped-up earth and sand to a dump body of the dump truck M3 (step S04). The operator of the hydraulic excavator M1 estimates whether or not an amount of earth and sand loaded on the dump truck M3 is less than a loadable capacity of the dump truck M3 of the dump truck M3 (step S05). In a case where it is determined that the amount of earth and sand loaded on the dump truck M3 is less than the loadable capacity of the dump truck M3 of the dump truck M3 (step S05: YES), the operator of the hydraulic excavator M1 slews an upper slewing body of the hydraulic excavator M1 toward aggregated earth and sand or earth and sand to be excavated (step S06). The operator of the hydraulic excavator M1 scoops up the aggregated earth and sand or the excavated earth and sand with the hydraulic excavator M1 (step S07). Next, the operator of the hydraulic excavator M1 slews the upper slewing body of the hydraulic excavator M1 toward the dump truck M3 (step S08), and releases the earth and sand in the same manner as in the process in step S4. This is repeatedly executed, and thus the operator of the hydraulic excavator M1 can load earth and sand up to the loadable capacity of the dump truck M3. In a case where it is determined that an amount of earth and sand loaded on the dump truck M3 reaches the loadable capacity of the dump truck M3 (step S05: NO), the operator of the hydraulic excavator M1 finishes the loading work of the hydraulic excavator M1.

The hydraulic excavator M1 disposed in the earth cut location G1 may shape a slope in the earth cut location G1. The operator of the hydraulic excavator M1 causes the hydraulic excavator M1 to come close to a slope region designed as a slope, and shapes earth and sand on a surface of the slope region with a bucket while moving in an extending direction of the slope. Hereinafter, the hydraulic excavator M1 for slope shaping work will be referred to as a slope excavator in some cases.

The bulldozer M2 disposed in the earth cut location G1 excavates and transports earth and sand in the earth cut location G1. An operator of the bulldozer M2 moves the bulldozer M2 forward in a state in which a position of a blade of the bulldozer M2 is adjusted, and can thus excavate earth and sand with the bulldozer M2. The bulldozer M2 disposed in the earth cut location G1 compacts a ground after excavation. The operator of the bulldozer M2 causes the bulldozer M2 in a state in which the blade of the bulldozer M2 is raised, and can thus compact the ground with the bulldozer M2. A traveling speed of the bulldozer M2 during compaction is higher than a traveling speed during excavation.

The dump truck M3 transports the earth and sand loaded in the earth cut location G1 to the banking location G2. In a case where the dump truck M3 unloads the earth and sand in the banking location G2, the dump truck M3 is moved from the banking location G2 to the earth cut location G1. A traveling speed of the dump truck M3 differs between when the dump truck is loaded with earth and sand and when the dump truck is not loaded therewith. A traveling speed of the dump truck M3 differs between when the dump truck is traveling inside the banking location G2 or the earth cut location G1 and when the dump truck is traveling on the traveling path G3 which is outside the locations.

In a case where the dump truck M3 is at a standstill at a standstill position in each of the earth cut location G1 and the banking location G2, an operator of the dump truck M3 turns the dump truck M3, and causes the dump truck M3 to travel backward and thus to be at a standstill at the standstill position.

The hydraulic excavator M1 disposed in the banking location G2 piles the earth and sand unloaded from the dump truck M3 in the banking location G2. In this case, in the same manner as the h1$m$ disposed in the earth cut location G1, the hydraulic excavator M1 disposed in the banking location G2 repeatedly executes processes of directing an upper slewing body thereof toward the unloaded earth and sand, scooping up the earth and sand, slewing the upper slewing body to a location where the earth and sand are to be spread, and releasing the earth and sand to the location where the earth and sand are to be spread.

The hydraulic excavator M1 disposed in the banking location G2 may shape a slope in the banking location G2.

The bulldozer M2 disposed in the banking location G2 lays and levels the earth and sand transported by the dump truck M3 in the banking location G2. Specifically, the bulldozer M2 uniformly lays and levels earth and sand discharged by the dump truck M3 or the like in a region in which the earth and sand are to be laid and leveled. In the laying-leveling work, a height of earth and sand to be laid once, that is, a height of a landform to be piled more than before laying and leveling is defined depending on a situation of the construction site G or by an operator. In order to lay and level discharged earth and sand by a predetermined height, the bulldozer M2 sets its blade at a predetermined height, and then performs the laying-leveling work. The laying-leveling work is repeatedly performed a plurality of times until a region where earth and sand are to be laid and leveled reaches a target height.

Figure 3:
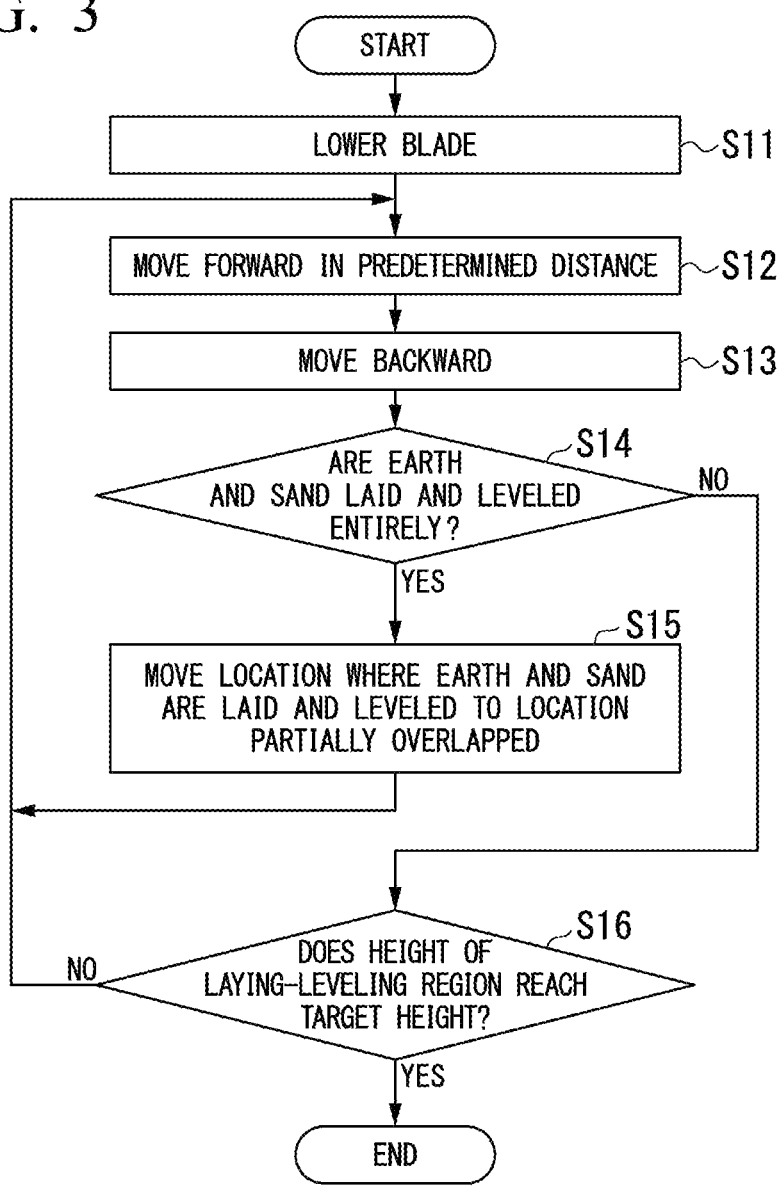
FIG. 3 is a flowchart showing an operation of laying-leveling work of a bulldozer.

FIG. 3 is a flowchart showing an operation of laying-leveling work of the bulldozer.

In a case where earth and sand are spread by the dump truck M3 in a region where the earth and sand are to be laid and leveled, the operator of the bulldozer M2 lowers the blade to any height (step S11). A height of earth and sand to be laid and leveled is determined by the height of the blade. Next, the operator of the bulldozer M2 moves the bulldozer M2 forward in the laying-leveling region, so as to level the earth and sand (step S12). The bulldozer M2 is moved forward once, and thus the earth and sand can be laid and leveled up to the front by a predetermined distance (for example, about 10 meters). In a case where the bulldozer M2 is moved forward by the predetermined distance, the operator of the bulldozer M2 moves the bulldozer M2 backward (step S13). The operator of the bulldozer M2 determines whether or not the earth and sand are laid and leveled in the entire laying-leveling region with the bulldozer M2 (step S14). In a case where there is a location were earth and sand are not laid and leveled (step S14: NO), the operator of the bulldozer M2 moves the bulldozer M2 such that the blade is adjusted to a position which include the location where earth and sand are not laid and leveled and partially overlaps a location where earth and sand are already laid and leveled (step S15). For example, the operator of the bulldozer M2 moves the bulldozer M2 obliquely backward during backward movement in step S13. The flow returns to the process in step S12, and forward movement and backward movement are repeated until earth and sand are laid and leveled in the entire laying-leveling region. In a case where it is determined that earth and sand are laid and leveled in the entire laying-leveling region (step S14: YES), the operator of the bulldozer M2 determines whether or not a height of the laying-leveling region reaches the target height (step S16). In a case where it is determined that the height of the laying-leveling region does not reach the target height (step S16: NO), the flow returns to the process in step S12, and forward movement and backward movement are repeated until the height of the laying-leveling region reaches the target height. On the other hand, in a case where it is determined that the height of the laying-leveling region reaches the target height (step S16: YES), the operator of the bulldozer M2 finishes the laying-leveling work of the bulldozer M2.

The bulldozer M2 disposed in the banking location G2 may compact the ground. The operator of the bulldozer M2 raises the blade of the bulldozer M2, causes the bulldozer M2 to travel, and can thus compact the ground with a crawler. A traveling speed of the bulldozer M2 during compaction is higher than a traveling speed during laying-leveling work.

<<Configuration of Construction Site Management Device>>

Figures 4, 5:
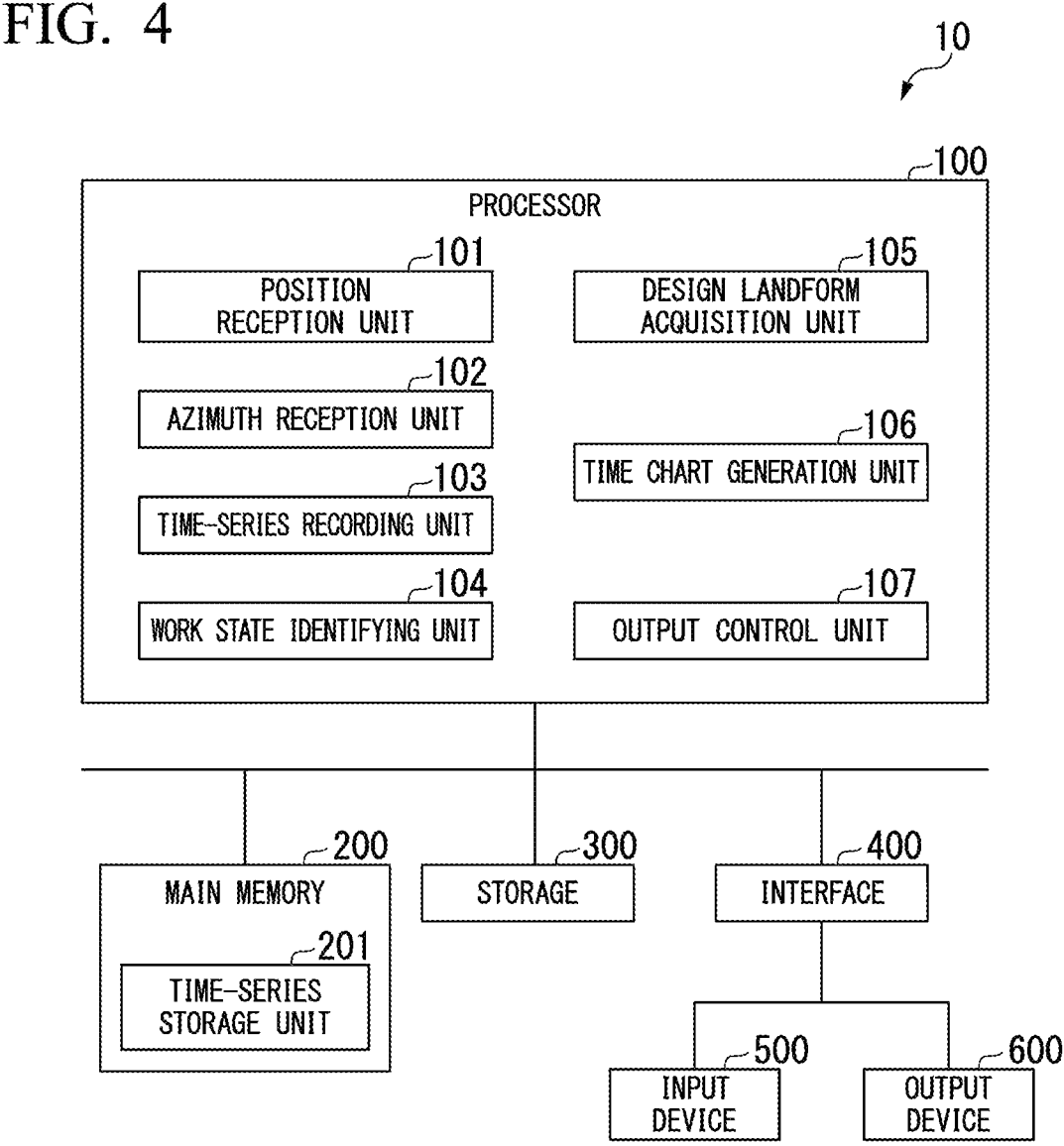
FIG. 4 is a schematic block diagram showing a configuration of a vehicle Management device according to the first embodiment.
FIG. 5 is a diagram showing data stored in a time-series storage unit.

FIG. 4 is a schematic block diagram showing a configuration of a construction site management device according to the first embodiment. A construction site management device 10 identifies a state of each vehicle M at each time point at the construction site G, and outputs the state in the form of a time chart.

The construction site management device 10 is a computer including a processor 100, a main memory 200, a storage 300, and an interface 400. The storage 300 stores a program. The processor 100 reads the program from the storage 300, develops the program to the main memory 200, and executes processes according to the program. The construction site management device 10 is connected to a network via the interface 400. The construction site management device 10 is connected to an input device 500 and an output device 600 via the interface 400. Examples of the input device 500 may include a keyboard, a mouse, and a touch panel. Examples of the output device 600 may include a monitor, a speaker, and a printer.

Examples of the storage 300 may include a hard disk drive (HDD), a solid state drive (SSD), a magnetic disk, a magnetooptical disc, a compact disc read only memory (CD-ROM), a digital versatile disc read only memory (DVD-ROM), and a semiconductor memory. The storage 300 may be an internal medium which is directly connected to a bus of the construction site management device 10, and may be an external medium which is connected to the construction site management device 10 via the interface 400. The storage 300 is a non-transitory storage medium.

The processor 100 functions as a position reception unit 101, an azimuth reception unit 102, a time-series recording unit 103, a work state identifying unit 104, a design landform acquisition unit 105, a time chart generation unit 106, and an output control unit 107, according to the execution of the program.

The processor 100 secures storage regions of a time-series storage unit 201 in the main memory 200 according to execution of the program.

The position reception unit 101 receives position data of each vehicle M disposed at the construction site G every predetermined time. The position data of the vehicle M may be received from a computer of the vehicle M, and may be received from a computer carried on the vehicle M. An example of the computer carried on the vehicle M may include a portable terminal.

The azimuth reception unit 102 receives azimuth data of each vehicle M disposed at the construction site G every predetermined time. The azimuth data of the vehicle M may be received from a computer of the vehicle M and may be received from a portable computer carried on the vehicle M. In a case where the portable computer carried on the vehicle M transmits the azimuth data, the computer is fixed to the vehicle M such that the computer is not rotatable. The azimuth data includes not only output data from a sensor such as an electronic compass or a geomagnetic sensor but also detection (including PPC pressure) of a slewing lever operation, or a detection result in a gyro sensor or an angle sensor of an upper slewing body. In other words, the azimuth reception unit 102 may identify an azimuth of the vehicle M by integrating an instantaneous change amount of the azimuth. The azimuth data may be detected by a sensor provided in the vehicle M or a sensor provided outside of the vehicle M. The sensor may be a sensor, for example, by detecting azimuth data through image analysis using a motion sensor or a camera.

The time-series recording unit 103 stores the position data received by the position reception unit 101 and the azimuth data received by the azimuth reception unit 102 into the time-series storage unit 201 in association with an ID of the vehicle M and reception time points thereof. FIG. 5 is a diagram showing data stored in the time-series storage unit. Consequently, the time-series storage unit 201 stores a time series of position data of each vehicle M and a time series of azimuth data of each vehicle M. The time series of the position data and the azimuth data may be an aggregate of position and azimuth data every predetermined time and may be an aggregate of position and azimuth data at an irregular time.

The work state identifying unit 104 identifies a work state of each vehicle M on the basis of a time series of position data and a time series of azimuth data stored in the time-series storage unit 201, and a time series of traveling speeds. Examples of the work state of the vehicle M may include the type of work executed by the vehicle M, a location where the vehicle M is located, and a traveling direction (forward movement or backward movement) of the vehicle M.

The type of work of the hydraulic excavator M1 may include excavation work, loading work, banking work, spreading work, and slope shaping work. The excavation work is work of excavating earth and sand of the construction site G. The loading work is work of loading excavated earth and sand onto the dump truck M3. The banking work is work of piling and compacting earth and sand discharged by the dump truck M3 on the construction site G. The spreading work is work of scattering and spreading earth and sand discharged by the dump truck M3 on the construction site G. The slope shaping work is shaping work of excavating and shaping a slope region at the construction site G in accordance with design landform data.

The type of work of the bulldozer M2 may include excavation-transport work, laying-leveling work, and compaction work. The excavation-transport work is work of excavating and transporting earth and sand of the construction site G with the blade. The laying-leveling work is work of laying and leveling earth and sand discharged by the dump truck M3 at a predetermined height. The compaction work is shaping work of compacting earth and sand of the construction site G with the crawler.

The type of work of the dump truck M3 may include unloaded traveling, loaded traveling, loading work, and discharge work. The unloaded traveling is work of traveling in a state in which there are no earth and sand in the dump body. The loaded traveling is work of traveling in a state in which there are earth and sand in the dump body. The loading work is standby work while earth and sand are loaded into the dump body by the hydraulic excavator M1. The discharge work is work of unloading earth and sand loaded in the dump body.

The work state identifying unit 104 identifies whether a traveling state of the bulldozer M2 is forward movement or backward movement. The work state identifying unit 104 identifies whether the dump truck M3 is located in the earth cut location G1 or the banking location G2 and whether the dump truck is being turned or moved backward, as a traveling state of the dump truck. The traveling state is an example of the work state.

The design landform acquisition unit 105 acquires design landform data representing a design landform of the construction site G. The design landform data is three-dimensional data, and includes position data in a global coordinate system. The design landform data includes landform type data indicating the type of landform. The design landform data is created by, for example, three-dimensional CAD.

The time chart generation unit 106 generates a time chart on the basis of the type of work identified by the work state identifying unit 104. The time chart according to the first embodiment is a chart in which a transverse axis expresses time, and the vehicles M are arranged on a longitudinal axis, and a work content of each vehicle is displayed in each time period.

The output control unit 107 outputs an output signal causing the time chart generated by the time chart generation unit 106 to be output, to the output device 600.

<<Time Chart Output Method>>

Figure 6:
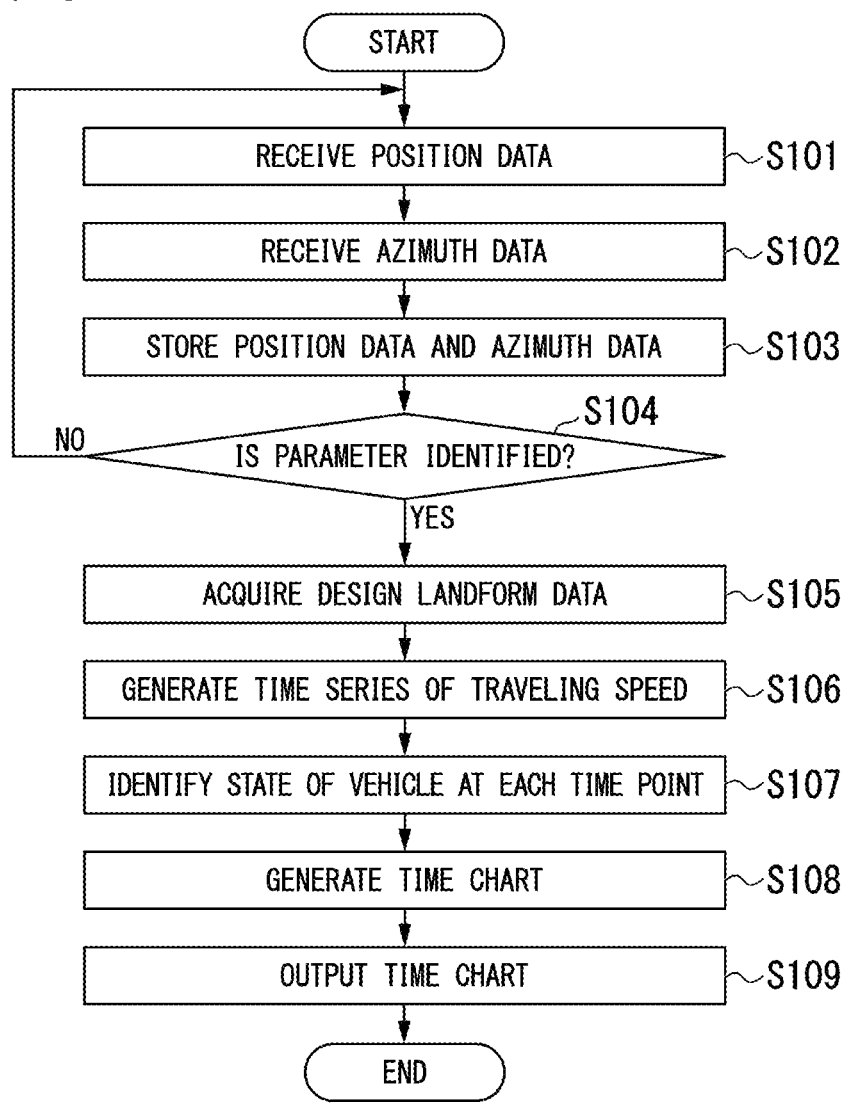
FIG. 6 is a flowchart showing a time chart output method according to the first embodiment.

Next, a description will be made of an operation of the construction site management device 10 according to the first embodiment. FIG. 6 is a flowchart showing a time chart output method according to the first embodiment.

The construction site management device 10 regularly collects position data and azimuth data from each vehicle M during a period which is a target of a time chart, and generates time-series data.

A computer mounted on each vehicle M or a computer carried by each vehicle M (hereinafter, referred to as a computer of the vehicle M) measures a position and an azimuth of the vehicle M every predetermined time. The computer of the vehicle M transmits position data indicating the measured position and azimuth data indicating the measured azimuth to the construction site management device 10. The position of the vehicle M is identified by a global navigation satellite system (GNSS) such as a global positioning system (GPS). The azimuth of the vehicle M is identified by, for example, an electronic compass provided in the vehicle M or the computer of the vehicle M.

The position reception unit 101 of the construction site management device 10 receives the position data from the computer of the vehicle M (step S101). The azimuth reception unit 102 receives the azimuth data from the computer of the vehicle M (step S102). The time-series recording unit 103 stores the received position data and azimuth data into the time-series storage unit 201 in association with reception time points and an TD of the vehicle M related to the computer which is a reception source (step S103). The construction site management device 10 determines whether or not a parameter identifying process is started due to a user's operation or the like (step S104).

In a case where the parameter identifying process is not started (step S104: NO), the construction site management device 10 repeatedly executes the processes from step S101 to step S103 until the parameter identifying process is started, and thus a time series of position data and azimuth data is formed in the time-series storage unit 201.

In a case where the time chart target period is finished (step S104: YES), the design landform acquisition unit 105 acquires design landform data (step S105). The work state identifying unit 104 calculates a traveling speed of each vehicle M at each time point on the basis of the time series of position data of each vehicle M stored in the time-series storage unit 201 (step S106). In other words, the work state identifying unit 104 generates a time series of traveling speeds of each vehicle M. The time series of traveling speeds may be acquired by using control area network (CAN) data of the vehicle M. Next, the work state identifying unit 104 identifies a work state of each vehicle M at each time point on the basis of the design landform data, and the position data, the azimuth data, and the time series of traveling speeds of the vehicle M (step S107). The time chart generation unit 106 generates a time chart on the basis of the state identified by the work state identifying unit 104 (step S108). The output control unit 107 outputs an output signal causing the time chart generated by the time chart generation unit 106 to be output, to the output device 600 (step S109).

Here, a detailed description will be made of a method in which the work state identifying unit 104 identifies a work state in step S107.

<<Method of Identifying Work State of Hydraulic Excavator M1 Disposed in Earth cut Location G1>>

Figure 7:
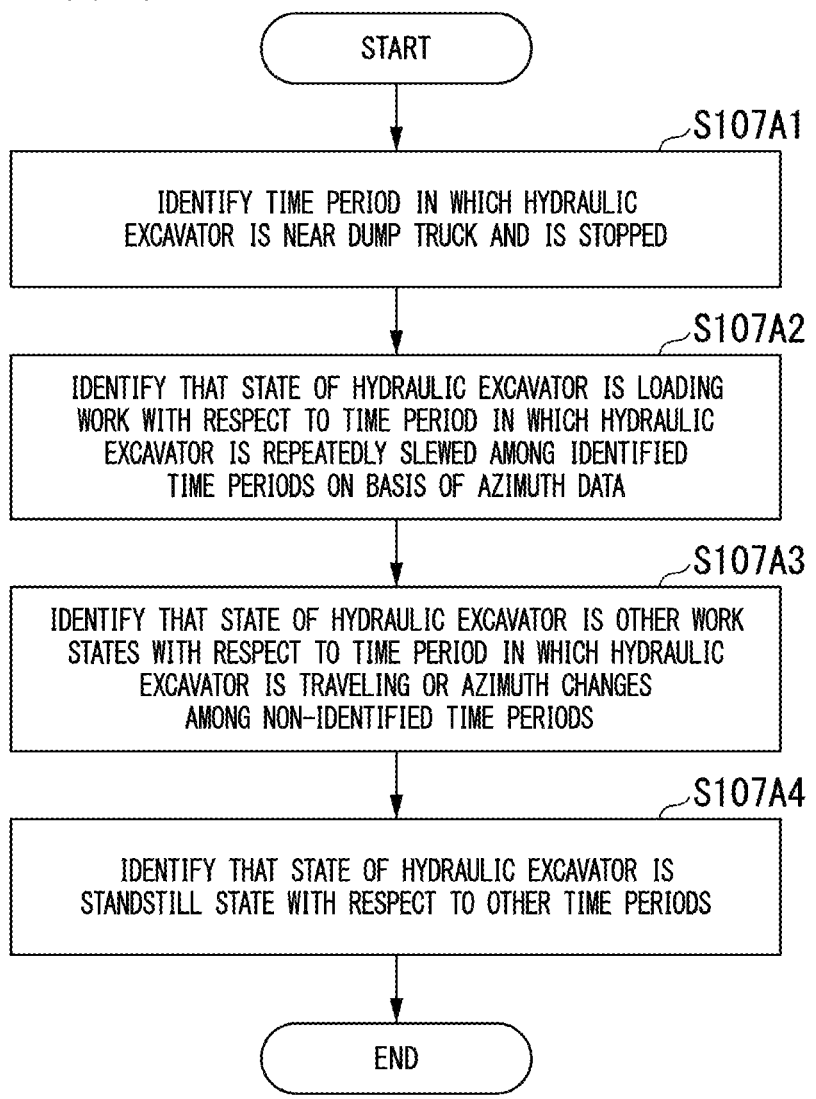
FIG. 7 is a flowchart showing a method of identifying a state of a hydraulic excavator disposed in an earth cut location in the first embodiment.
Figure 8:
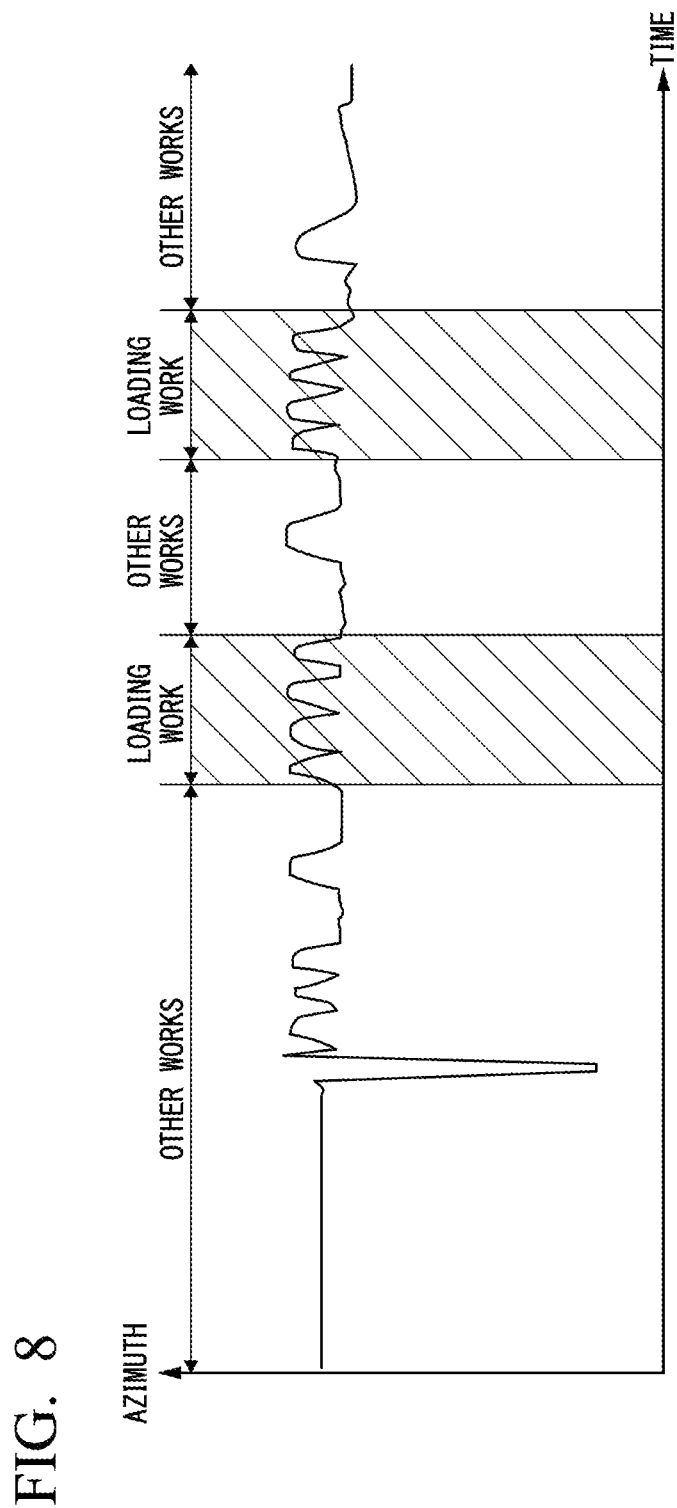
FIG. 8 is a diagram showing an example of time series of azimuth data of the hydraulic excavator.

FIG. 7 is a flowchart showing a method of identifying a work state of the hydraulic excavator disposed in the earth cut location in the first embodiment. FIG. 8 is a diagram showing an example of a time series of azimuth data of the hydraulic excavator.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107A1). The vehicle M "being stopped" indicates a work state in which the vehicle M is not traveling. In other words, a state in which the vehicle M is not traveling, and performs work such as excavation, slewing, raising and lowering a boom is also referred to as the vehicle M "being stopped". On the other hand, a work state in which the vehicle M is not traveling and also does not perform other work will be referred to as the vehicle M "being at a standstill". Next, the work state identifying unit 104 identifies that a work state (the type of work) of the hydraulic excavator M1 is a loading work state with respect to a time period in which the hydraulic excavator M1 is repeatedly slewed among the identified time periods on the basis of a time series of azimuth data (step S107A2). The work state identifying unit 104 may determine that the hydraulic excavator M1 is repeatedly slewed, for example, in a case where slewing in which an azimuth of the hydraulic excavator consecutively changes in the same direction at an angle equal to or higher than a predetermined angle (for example, 10 degrees) is repeatedly performed a predetermined number of times or more among the identified time periods. This is because the cycle operation from step S04 to step S08 shown in FIG. 2 appears as a repeated change in an azimuth of the hydraulic excavator M1 as shown in FIG. 8. In FIG. 8, a hatched portion represents a time period in which a distance between the hydraulic excavator M1 and the dump truck M3 is within a predetermined distance. As shown in FIG. 8, the work state identifying unit 104 determines that a work state of the hydraulic excavator M1 is a loading work state in the time period in which a distance between the hydraulic excavator M1 and the dump truck M3 is within the predetermined distance, and repeated slewing is performed.

Next, the work state identifying unit 104 identifies that a work state of the hydraulic excavator M1 is other work states with respect to a time period in which the hydraulic excavator M1 is traveling or an azimuth of the hydraulic excavator M1 changes among time periods in which a work state of the hydraulic excavator M1 is not identified (step S107A3). The other work states include excavation work and work of aggregating earth and sand to be loaded.

Next, the work state identifying unit 104 identifies that a work state of the hydraulic excavator M1 is a standstill state with respect to the time period in which a work state of the hydraulic excavator M1 is not identified (step S107A4).

<<Method of Identifying Work State of Hydraulic Excavator M1 Disposed Banking Location G2>>

Figure 9:
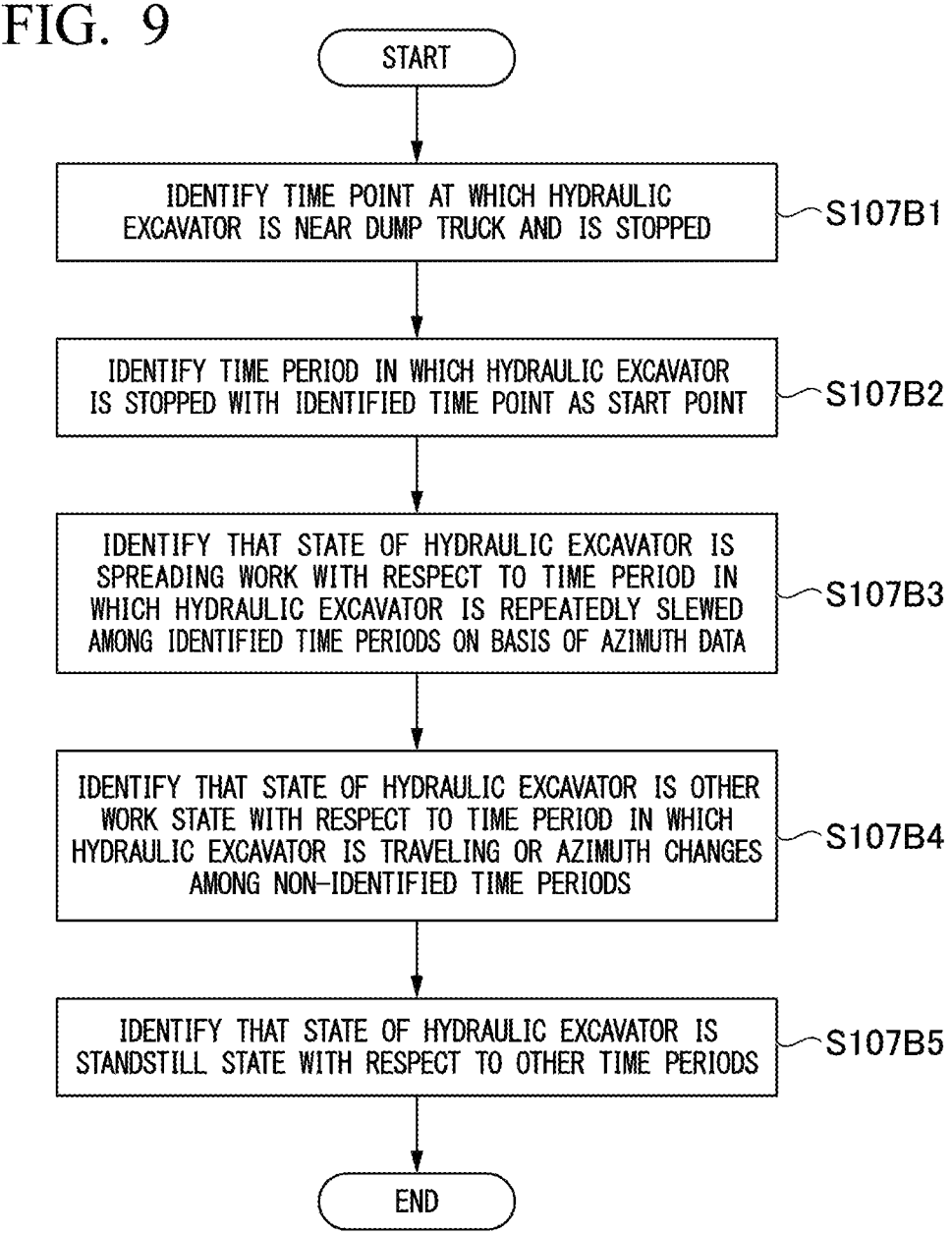
FIG. 9 is a flowchart showing a method of identifying a state of a hydraulic excavator disposed in a banking location in the first embodiment.

FIG. 9 is a flowchart showing a method of identifying a work state of the hydraulic excavator disposed in the banking location G2 in the first embodiment.

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of the time series of position data and the time series of traveling speeds (step S107B1). Next, the work state identifying unit 104 identifies a time point at which at least the hydraulic excavator M1 is stopped with the identified time point as a start point (step S107B2). The reason why position data of the dump truck M3 after the start point is not used is that, in a case where the dump truck M3 finishes discharge of earth and sand in the dump body thereof, the dump truck is moved to the earth cut location G1 regardless of a work state of the hydraulic excavator M1. Next, the work state identifying unit 104 identifies that a work state (the type of work) of the hydraulic excavator M1 is spreading work with respect to a time period in which the hydraulic excavator M1 is repeatedly slewed among the identified time periods on the basis of the time series of azimuth data (step S107B3).

Thereafter, the work state identifying unit 104 executes the processes in step S107B4 and step S107B5, and identifies one of a work state of the hydraulic excavator M1 being other work states and a standstill state with respect to a time period in which a work state of the hydraulic excavator M1 is not identified. The processes in step S107B4 and step S107B5 are the same as the processes in step S107A3 and step S107A4.

<<Method of Identifying Work State of Slope Excavator>>

Figure 10:
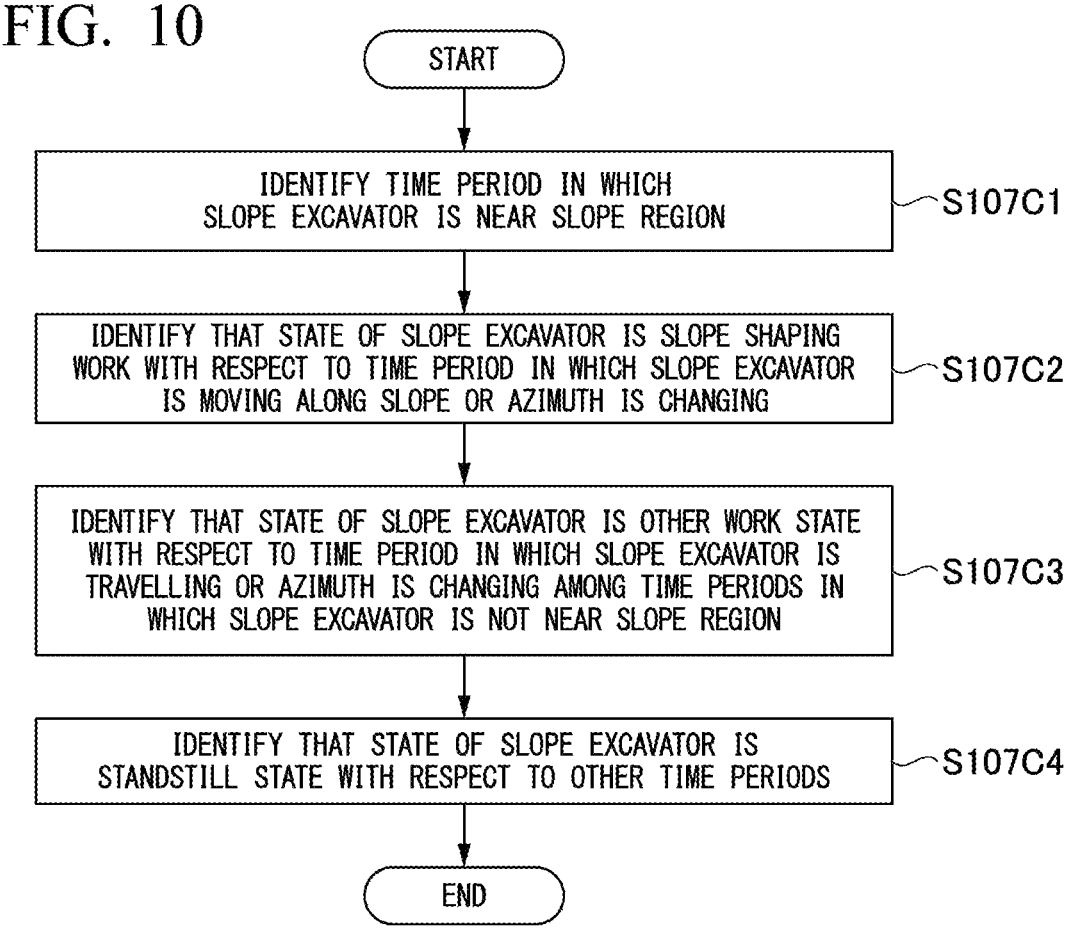
FIG. 10 is a flowchart showing a method of identifying a work state of a slope excavator in the first embodiment.

FIG. 10 is a flowchart showing a method of identifying a work state of a slope excavator in the first embodiment. The slope excavator indicates the hydraulic excavator M1 performing work of shaping a slope.

With respect to a slope excavator, the work state identifying unit 104 identifies time periods in which the slope excavator is located within a predetermined distance from a slope region of design landform data on the basis of a time series of position data and the design landform data acquired by the design landform acquisition unit 105 (step S107C1). The work state identifying unit 104 identifies that a work state (the type of work) of the slope excavator is slope shaping work with respect to a time period in which the slope excavator is being moved along a slope extending direction or an azimuth of the slope excavator is turning among the identified time periods (step S107C2). The slope shaping work is work for the slope excavator to excavate and shape the slope region at the construction site in accordance with the design landform data.

Next, the work state identifying unit 104 identifies that a work state of the slope excavator is other work states with respect to a time period in which the slope excavator is traveling or an azimuth of the slope excavator is changing among time periods in which a work state of the slope excavator is not identified, that is, the slope excavator is not located within a predetermined distance from the slope region (step S107C3). Next, the work state identifying unit 104 identifies that a work state of the slope excavator is a standstill state with respect to the time periods in which a work state of the slope excavator is not identified (step S107C4).

<<Method of Identifying Work State of Bulldozer M2>>

Figure 11:
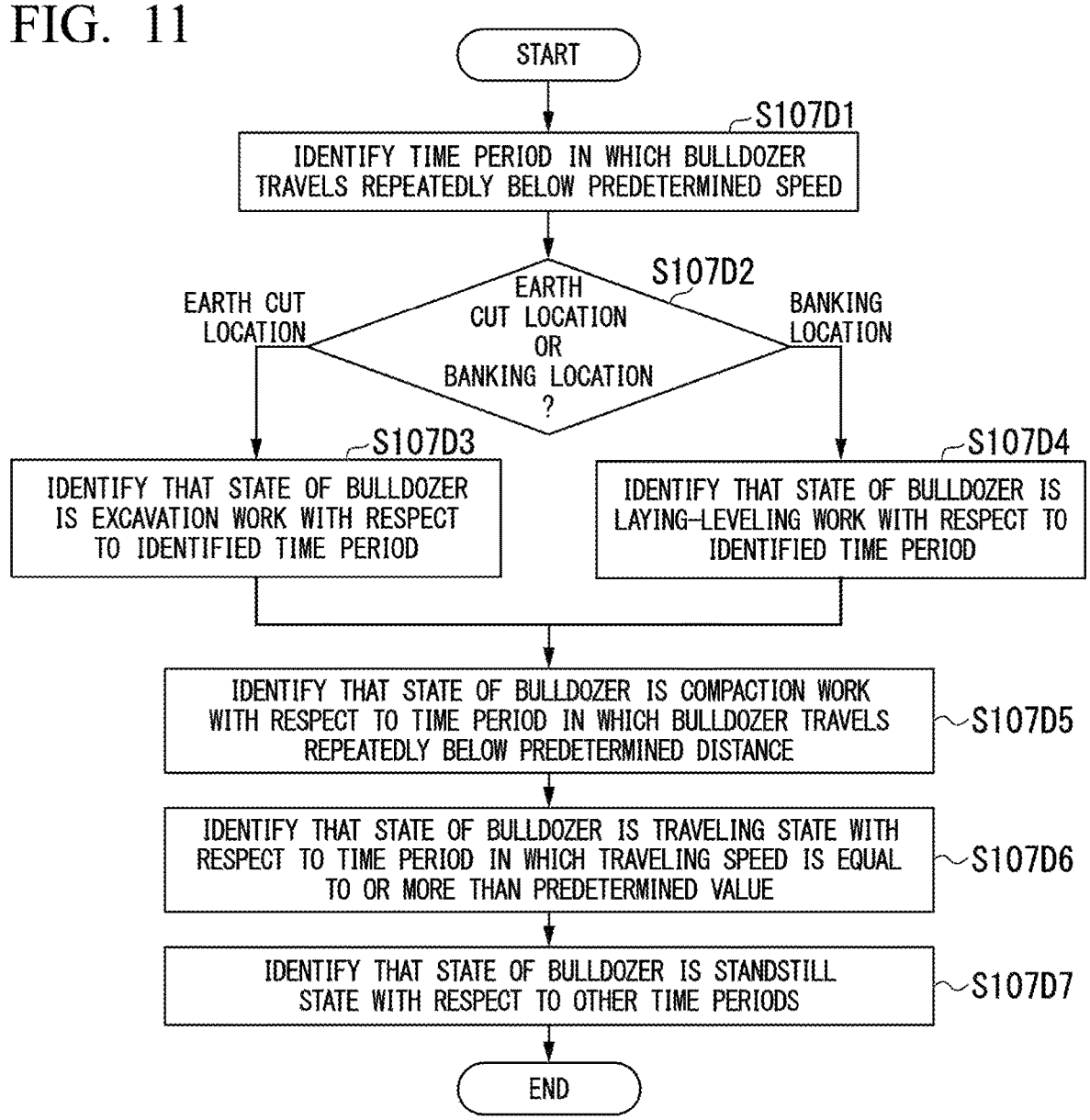
FIG. 11 is a flowchart showing a method of identifying a work state of a bulldozer in the first embodiment.

FIG. 11 is a flowchart showing a method of identifying a work state of the bulldozer in the first embodiment.

With respect to the bulldozer M2, the work state identifying unit 104 identifies time periods in which the bulldozer M2 is repeatedly moved forward and backward, and a speed during forward movement is equal to or lower than a predetermined speed (for example, 5 kilometers per hour), on the basis of a time series of position data and a time series of traveling speeds (step S107D1). Next, the work state identifying unit 104 determines whether the bulldozer M2 is disposed in the earth cut location G1 or the banking location G2 on the basis of the time series of position data (step S107D2). In a case where the bulldozer M2 is disposed in the earth cut location G1 (step S107D2: earth cut location), the work state identifying unit 104 identifies that a work state (the type of work) of the bulldozer M2 is excavation-transport work with respect to the identified time periods (step S107D3). On the other hand, in a case where the bulldozer M2 is disposed in the banking location G2 (step S107D2: banking location), the work state identifying unit 104 that a work state (the type of work) of the bulldozer M2 is laying-leveling work with respect to the identified time periods (step S107D4).

Next, the work state identifying unit 104 identifies that a work state (the type of work) of the bulldozer M2 is compaction work with respect to a time period in which the bulldozer M2 is repeatedly moved forward and backward in a predetermined distance (for example, 8 meters) or less among time periods in which a work state of the bulldozer M2 is not identified (step S107D5).

Next, the work state identifying unit 104 identifies that a work state of the bulldozer M2 is a traveling state with respect to a time period in which a traveling speed of the bulldozer M2 is equal to or more than a predetermined value among the time periods in which a work state of the bulldozer M2 is not identified (step S107D6).

Next, the work state identifying unit 104 identifies that a work state of the bulldozer M2 is a standstill state with respect to the time periods in which a work state of the bulldozer M2 is not identified (step S107D7).

The work state identifying unit 104 according to the first embodiment determines whether the type of work is excavation-transport work or laying-leveling work on the basis of a traveling speed of the bulldozer M2, but is not limited thereto. For example, in other embodiments, the work state identifying unit 104 may determine whether the type of work is excavation-transport work or laying-leveling work on the basis of both or one of repeated traveling distances and a traveling speed of the bulldozer M2.

The work state identifying unit 104 according to the first embodiment determines whether or not the type of work is compaction work on the basis of repeated traveling distances of the bulldozer M2, but is not limited thereto. For example, in other embodiments, the work state identifying unit 104 may determine whether or not the type of work is compaction work on the basis of both or one of repeated traveling distances and a traveling speed of the bulldozer M2.

Generally, a traveling speed in excavation-transport work and laying-leveling work is lower than a traveling speed in compaction work. Generally, a traveling distance in excavation-transport work and laying-leveling work is longer than a traveling distance in compaction work.

<<Method of Identifying Work State of Dump Truck M3>>

Figure 12:
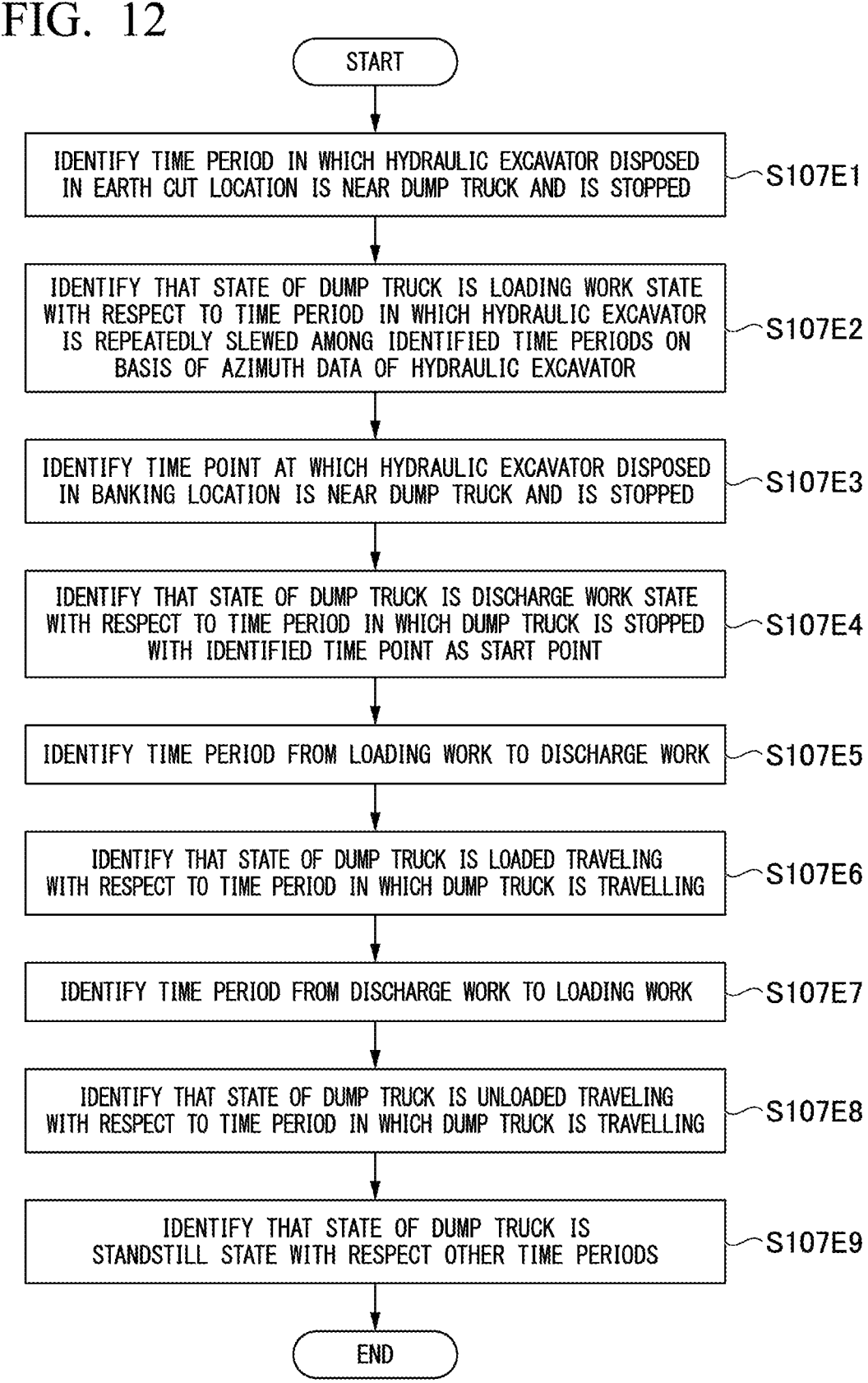
FIG. 12 is a flowchart showing a method of identifying a work state of a dump truck in the first embodiment.

FIG. 12 is a flowchart showing a method of identifying a work state of the dump truck in the first embodiment.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107E1). Next, the work state identifying unit 104 identifies that a work state (the type of work) of the dump truck M3 located within a predetermined distance from the hydraulic excavator M1 is a loading work state with respect to a time period in which the hydraulic excavator M1 is repeatedly slewed among the identified time periods on the basis of a time series of azimuth data (step S107E2).

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of a time series of position data and a time series of traveling speeds (step S107E3). Next, the work state identifying unit 104 identifies that a work state (the type of work) of the dump truck M3 is a discharge work state with respect to a time period in which at least the dump truck M3 is stopped with the identified time point as a start point (step S107E4).

The work state identifying unit 104 identifies a time period from an end time point of the loading work to a start time point of the discharge work among time periods in which, with respect to the dump truck M3, the loading work is not identified in step S107E2 and the discharge work is not identified in step S107E4 (step S107E5).

The work state identifying unit 104 identifies that a work state (the type of work) of the dump truck M3 is loaded traveling with respect to a time period in which the dump truck M3 is traveling among the identified time periods on the basis of a time series of traveling speeds (step S107E6).

The work state identifying unit 104 identifies a time period from an end time point of the discharge work to a start time point of the loading work among the time periods in which, with respect to the dump truck M3, loading work is not identified in step S107E2 and discharge work is not identified in step S107E4 (step S107E7).

The work state identifying unit 104 identifies that a work state (the type of work) of the dump truck M3 is unloaded traveling with respect to a time period in which the dump truck M3 is traveling among the identified time periods on the basis of a time series of traveling speeds (step S107E8).

In other embodiments, the work state identifying unit 104 may further determine whether a work state of the dump truck M3 immediately before a loading work state or a discharge work state is any one of turning traveling, backward traveling, and inside-location traveling, on the basis of a traveling speed, a traveling direction, and the like of the dump truck M3. For example, in a case where a traveling speed is low, the work state identifying unit 104 may identify that a work state of the dump truck M3 is inside-location traveling. For example, in a case where a traveling direction is a backward direction, the work state identifying unit 104 may identify that a work state of the dump truck M3 is backward traveling.

Next, the work state identifying unit 104 identifies that a work state of the dump truck M3 is a standstill state with respect to a time period in which a work state of the dump truck M3 is not identified (step S107E9).

Figure 13:
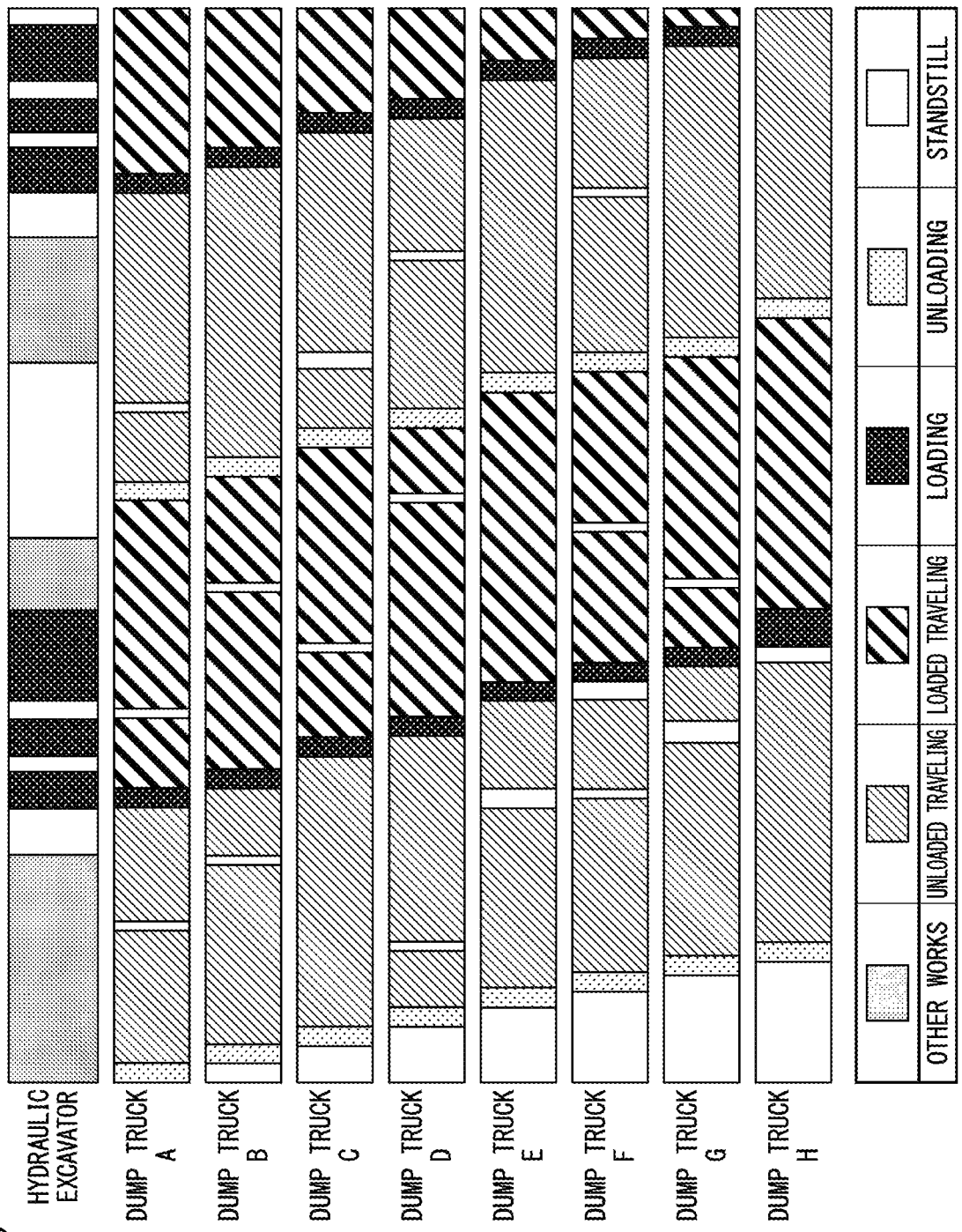
FIG. 13 illustrates an example of a time chart generated by the construction site management device according to the first embodiment.

FIG. 13 illustrates an example of a time chart screen generated by the construction site management device according to the first embodiment.

In a case where the work state identifying unit 104 identifies the state of each vehicle M in each time through the process in step S107, the time chart generation unit 106 generates a time chart screen in which a transverse axis is a time axis, and the vehicles M forming a fleet are arranged on a longitudinal axis, as shown in FIG. 13. The vehicles M arranged on the longitudinal axis of the time chart screen include different individuals of the same type, and the individuals are identified by, for example, displaying identification numbers of the vehicles M. The time chart screen shown in FIG. 13 is, for example, a screen in which time charts respectively representing states of a single hydraulic excavator M1 disposed in the earth cut location G1 and eight dump trucks M3 which are loaded with earth and sand by the hydraulic excavator M1 and transport the earth and sand between the earth cut location G1 and the banking location G2 on the time basis are displayed on an identical screen with the time axis as a common axis. In other words, at the construction site G, the single hydraulic excavator M1 and the eight dump trucks M3 form a fleet. The "identical screen" includes an identical paper sheet in a case where the output device is a printer.

It can be seen that, in a time period in which the hydraulic excavator M1 performs loading, some of the dump trucks M3 also perform loading. In a case where loading in a certain dump truck M3 is completed, and then the next dump truck M3 does not reach a loading region yet, the hydraulic excavator M1 performs other work. In other words, as the other work, the hydraulic excavator M1 performs so-called food gathering of excavating earth and sand to be excavated in advance and piling up the earth and sand around the hydraulic excavator M1 (step S01 in FIG. 2). Consequently, the hydraulic excavator M1 can efficiently perform loading work when the dump truck M3 arrives. In the example shown in FIG. 13, the hydraulic excavator M1 performs other work during a predetermined period after first loading work onto the eight dump trucks M3 (A to F) is completed. On the other hand, there is a lot of time until the next dump truck M3A arrives, and thus the hydraulic excavator M1 is at a standstill state for a long period of time. Therefore, at the construction site G, the dump truck M3 is additionally disposed, and thus it can be seen that the overall efficiency can be improved by reducing the time for which the hydraulic excavator M1 is at a standstill state.

Advantageous Effects

As mentioned above, according to the first embodiment, the construction site management device 10 identifies a state of the vehicle M at each time point, and outputs a time chart displaying the identified state at each time point to an identical screen of the output device 600. Consequently, a manager of the construction site G can easily recognize a work state of a fleet including a transport vehicle and a work machine without changing a screen. The manager of the construction site G can recognize the efficiency of the entire fleet by visually recognizing the output time chart. For example, in the example shown in FIG. 13, since there is a lot of time for which the hydraulic excavator M1 in the earth cut location G1 is at a standstill, the manager may examine that the number of dump trucks M3 is increased such that loading work can be performed for the time, or the hydraulic excavator M1 is caused to perform slope shaping work for the time.

According to the first embodiment, the construction site management device 10 identifies the type of work of a certain vehicle M on the basis of a relationship between a position of the certain vehicle M (for example, the hydraulic excavator M1) and another vehicle M (for example, the dump truck M3). Consequently, the construction site management device 10 can accurately identify the type of work of the vehicle M.

According to the first embodiment, for each state (forward movement or backward movement, that is, the type of work) of the vehicle M, the construction site management device 10 identifies a traveling speed of the vehicle M in the state on the basis of a time series of position data of the vehicle M. Consequently, the construction site management device 10 can identify a traveling speed in each state even though the vehicle M does not output a state and a traveling speed through communication.

The construction site management device 10 according to the first embodiment identifies a work state of the vehicle M on the basis of a positional relationship between the vehicle M and another vehicle M by using a GNSS, but is not limited thereto. For example, the construction site management device 10 according to other embodiments may identify a work state of the vehicle M by using a positional relationship between the vehicles M through inter-vehicle communication.

In the first embodiment, a time chart screen is generated in which time charts of the respective vehicles M having a common time axis are arranged, the time charts having a transverse axis as the time axis and a longitudinal axis on which the vehicles M forming a fleet are arranged, but this is only an example. For example, in other embodiments, in a form in which a time axis is provided for each vehicle M, a time chart screen may be generated in other forms such as a longitudinal axis being set as the time axis.

Second Embodiment

Next, a second embodiment will be described. The construction site management device 10 according to the first embodiment determines that a work state of the dump truck M3 is unloaded traveling in a case of traveling after loading work and before discharge work, and that a work state thereof is loaded traveling in a case of traveling after discharge work and before loading work. In contrast, in the second embodiment, a state of the dump truck M3 is identified on the basis of position information of the dump truck M3.

A work state of the dump truck M3 identified by the construction site management device 10 according to the second embodiment includes outside-location loaded traveling in which the dump truck is traveling on the traveling path G3 in a loaded state, outside-location unloaded traveling in which the dump truck is traveling on the traveling path G3 in an unloaded state, turning traveling in which the dump truck is traveling in a turning region provided in the earth cut location G1 or the banking location G2, backward traveling in which the dump truck is traveling in a backward region provided in the earth cut location G1 or the banking location G2, inside-location loaded traveling in which the dump truck is normally traveling in a loaded state in the earth cut location G1 or the banking location G2, and inside-location unloaded traveling in which the dump truck is traveling in an unloaded state in the earth cut location G1 or the banking location G2. The earth cut location G1, the banking location G2, the turning region, and the backward region are designated as, for example, geofences in advance. In this case, the work state identifying unit 104 identifies a work state of the dump truck M3 on the basis of whether or not a position indicated by position data of the dump truck M3 is inside a geofence.

Figure 14:
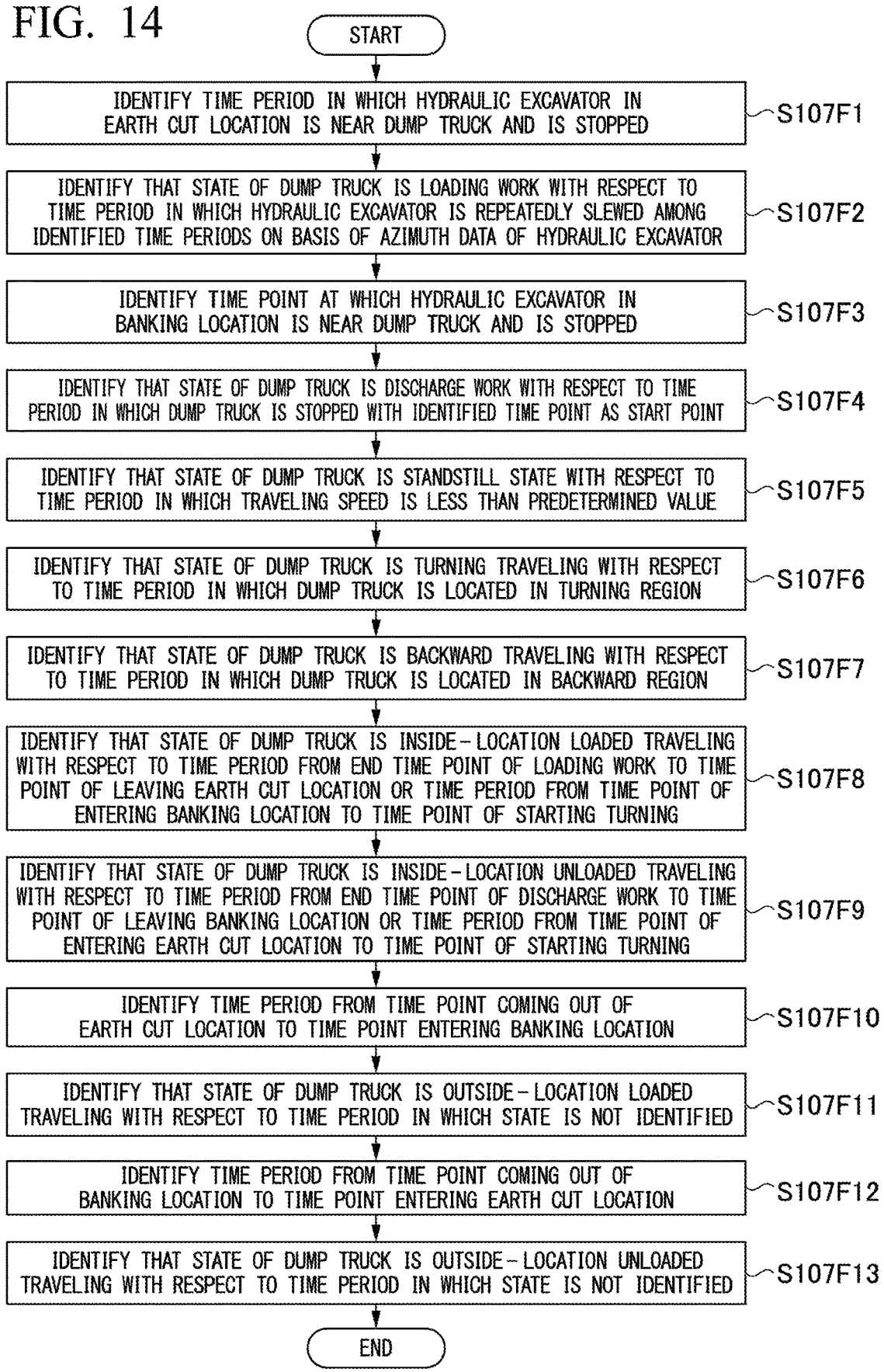
FIG. 14 is a flowchart showing a method of identifying a work state of a dump truck in a second embodiment.

FIG. 14 is a flowchart showing a method of identifying a state of the dump truck in the second embodiment.

The work state identifying unit 104 identifies time periods in which the dump truck M3 is located within a predetermined distance from the hydraulic excavator M1 disposed in the earth cut location G1, and the hydraulic excavator M1 and the dump truck M3 are stopped, on the basis of a time series of position data and a time series of traveling speeds (step S107F1). Next, the work state identifying unit 104 identifies that a work state (the type of work) of the dump truck M3 located within a predetermined distance from the hydraulic excavator M1 is a loading work state with respect to a time period in which the hydraulic excavator M1 is repeatedly slewed among the identified time periods on the basis of a time series of azimuth data (step S107F2).

The work state identifying unit 104 identifies a time point at which the dump truck M3 is located within a predetermined distance from the hydraulic excavator M1 disposed in the banking location G2, and the hydraulic excavator M1 and the dump truck M3 are stopped, on the basis of a time series of position data and a time series of traveling speeds (step S107F3). Next, the work state identifying unit 104 identifies that a work state (the type of work) of the dump truck M3 is a discharge work state with respect to a time period in which at least the dump truck M3 is stopped with the identified time point as a start point (step S107F4).

The work state identifying unit 104 identifies that a work state of the dump truck M3 is a standstill state with respect to a time period in which a traveling speed of the dump truck M3 is less than a predetermined value among time periods in which a work state of the dump truck M3 is not identified (step S107F5).

The work state identifying unit 104 identifies that a work state of the dump truck M3 is turning traveling with respect to a time period in which the dump truck M3 is located in the turning region among the time periods in which a work state of the dump truck M3 is not identified (step S107F6). The work state identifying unit 104 identifies that a work state of the dump truck M3 is backward traveling with respect to a time period in which the dump truck M3 is located in the backward region among the time periods in which a work state of the dump truck M3 is not identified (step S107F7).

The work state identifying unit 104 identifies that a work state of the dump truck M3 is inside-location loaded traveling with respect to a time period from an end time point of loading work in the earth cut location G1 to a time point at which the dump truck leaves the earth cut location G1 or a time period from a time point at which the dump truck enters the banking location G2 to a time point at which the dump truck enters the turning region of the banking location G2 among the time periods in which a work state of the dump truck M3 is not identified (step S107F8). The work state identifying unit 104 identifies that a work state of the dump truck M3 is inside-location unloaded traveling with respect to a time period from an end time point of discharge work in the banking location G2 to a time point at which the dump truck leaves the banking location G2 or a time period from a time point at which the dump truck enters the earth cut location G1 to a time point at which the dump truck enters the turning region of the earth cut location G1 among the time periods in which a work state of the dump truck M3 is not identified (step S107F9). In other words, even though the dump truck M3 is located in the earth cut location G1 or the banking location G2, in a case where the dump truck M3 is located in the turning region or the backward region of the earth cut location G1 or the banking location G2, a work state of the dump truck M3 is not inside-location loaded traveling or inside-location unloaded traveling.

The work state identifying unit 104 identifies time periods from a time point at which the dump truck comes out of the earth cut location G1 to a time point at which the dump truck enters the banking location G2 (step S107F10). The work state identifying unit 104 identifies that a work state of the dump truck M3 is outside-location loaded traveling with respect to a time period in which a work state of the dump truck M3 is not identified among the time periods identified in step S107F10 (step S107F11).

The work state identifying unit 104 identifies time periods from a time point at which the dump truck comes out of the banking location G2 to a time point at which the dump truck enters the earth cut location G1 (step S107F12). The work state identifying unit 104 identifies that a work state of the dump truck M3 is outside-location unloaded traveling with respect to a time period in which a work state of the dump truck M3 is not identified among the time periods identified in step S107F12 (step S107F13).

In other words, the construction site management device 10 according to the second embodiment identifies a work state of the vehicle M on the basis of a position of the vehicle M, that is, whether or not the vehicle M is present in a predetermined region, whether or not the vehicle M enters a region, or whether or not the vehicle M comes out of a region.

Other Embodiments

As mentioned above, embodiments has been described with reference to the drawings, but a specific configuration is not limited to the above-described configurations, and various design changes may occur.

For example, the time chart shown in FIG. 13 represents states of the hydraulic excavator M1 and the dump trucks M3. In other words, the hydraulic excavator M1 is an example of a work machine, and the dump truck M3 is an example of a transport vehicle. On the other hand, a time chart generated by the construction site management device 10 according to other embodiments is not limited to indicating a relationship between the hydraulic excavator M1 and the dump truck M3. For example, in other embodiments, in a case where the bulldozer M2 is disposed in the banking location G2, and the dump truck M3 transports earth and sand from the earth cut location G1 to the banking location G2, the construction site management device 10 may generate a time chart indicating a relationship between the bulldozer M2 and the dump truck M3. In this case, the bulldozer M2 is an example of a work machine, and the dump truck M3 is an example of a transport vehicle. For example, in other embodiments, in a case where the hydraulic excavator M1 and the bulldozer M2 are disposed in the banking location G2, and the bulldozer M2 transports earth and sand excavated by the hydraulic excavator M1 in the banking location G2, the construction site management device 10 may generate a time chart indicating a relationship between the hydraulic excavator M1 and the bulldozer M2. In this case, the hydraulic excavator M1 is an example of a work machine, and the bulldozer M2 is an example of a transport vehicle.

In the embodiments, the construction site management device 10 identifies a work state of each vehicle M in each period of time or every predetermined period of time, and generates a time chart on the basis thereof, but is not limited to. For example, in other embodiments, the construction site management device 10 may identify a work state of each vehicle M in an irregular period of time as a work state at each time point, so as to generate a time chart on the basis thereof, and may identify a start time point and an end time point of each work state at a work state at each time point, so as to generate a time chart on the basis thereof.

In the embodiments, the hydraulic excavator M1, the bulldozer M2, and the dump truck M3 have been described as examples of the vehicle M, but are not limited thereto. For example, the construction site management device 10 may identify a state of a wheel loader or a road roller, and may generate a time chart. States of the wheel loader and the road roller may be obtained according to the same method as the method of obtaining a state of the bulldozer M2.

The hydraulic excavator M1 according to other embodiments may shape a groove. A work state and a parameter of the hydraulic excavator M1 shaping a groove may be obtained according to the same method as the method of obtaining a work state and a parameter of the slope excavator. Examples of parameters related to a wafer amount in groove excavation work may include a distance of a groove an area of the groove, or an earth amount of the groove, excavated and shaped per unit time. The groove excavation work is an example of shaping work.

The hydraulic excavator M1 according to other embodiments may perform excavation work without loading. For example, the hydraulic excavator M1 may excavate excavation target earth and sand, and may discharge the excavated earth and sand around another loading excavator such that the loading excavator easily excavates the earth and sand. In this case, excavation work is determined by identifying a time period in which the hydraulic excavator M1 is stopped and is repeatedly slewed. In determination of the excavation work, a condition in which the hydraulic excavator M1 is near the dump truck M3 may not be referred to. A parameter for the excavation work in this case may be obtained according to the same method as the method of obtaining a parameter for loading work of the hydraulic excavator M1.

At the construction site management device 10 according to the embodiments, a description has been made of a case where the program is stored in the storage 300, but this is only an example. For example, in other embodiments, the program may be delivered to the construction site management device 10 via a communication line. In this case, the construction site management device 10 develops the delivered program to the main memory 200 and executes the processes.

The program may realize some of the functions. For example, the program may realize the functions through a combination with another program already stored in the storage 300 or a combination with another program installed in another device.

The construction site management device 10 may include a programmable logic device (PLD) in addition to the configuration or instead of the configuration. Examples of the PLD may include a programmable array logic (PAL), a generic array logic (GAL), a complex programmable logic device (CPLD), and a field programmable gate array (FPGA). In this case, some of the functions realized by the processor 100 may be realized by the PLD.

INDUSTRIAL APPLICABILITY

The construction site management device enables a work state of a fleet including a transport vehicle and a work machine to be easily recognized.

REFERENCE SIGNS LIST

10: CONSTRUCTION SITE MANAGEMENT DEVICE
100: PROCESSOR
200: MAIN MEMORY
300: STORAGE
400: INTERFACE
500: INPUT DEVICE
600: OUTPUT DEVICE
101: POSITION RECEPTION UNIT
102: AZIMUTH RECEPTION UNIT
103: TIME-SERIES RECORDING UNIT
104: WORK STATE IDENTIFYING UNIT
105: DESIGN LANDFORM ACQUISITION UNIT
106: TIME CHART GENERATION UNIT
107: OUTPUT CONTROL UNIT
201: TIME-SERIES STORAGE UNIT
G CONSTRUCTION SITE
G1: EARTH CUT LOCATION
G2: BANKING LOCATION
M: WORK MACHINE
M1: HYDRAULIC EXCAVATOR
M2: BULLDOZER
M3: DUMP TRUCK

The invention claimed is:

1. A construction site management device capable of recognizing a work state of a fleet including a transport vehicle and a work machine comprising:
   a processor;
   a main memory;
   a storage for storing a program;
   an output device;
   a work state identifying unit that identifies a first work state of the work machine disposed in a construction site at each time point during a target period and a second work state of the transport vehicle traveling at the construction site at each time point during the target period;
   a time chart generation unit that generates a first time chart representing the first work state of the work machine at each time point and a second time chart representing the second work state of the transport vehicle at each time point on the basis of the identified first and second work states; and
   an output control unit that outputs the first time chart representing the first work state of the work machine at each time point and the second time chart representing the second work state of the transport vehicle at each time point on an identical screen with a time axis as a common axis
   wherein the first work state includes at least one of a type of work executed by the work machine; a location where the work machine is located; or a forward or a backward traveling direction of the work machine, and
   wherein the second work state includes at least one of a type of work executed by the transport vehicle; a location where the transport vehicle is located; or a forward or a backward traveling direction of the transport vehicle.

2. The construction site management device according to claim 1,
   wherein the work state identifying unit identifies the first work state on the basis of based at least in part on at least one of position data or azimuth data of a plurality of the work machines vehicles at each time point, and
   wherein the work state identifying unit identifies the second work state on the basis of at least in part on at least one of position data or azimuth data of a plurality of the transport vehicles at each time point.

3. The construction site management device according to claim 2,
   wherein the work state identifying unit identifies the first work state or the second work state based at least in part on position data of the transport vehicle at each time point and a positional relationship with an earth cut location or a banking location.

4. The construction site management device according to claim 3,
   wherein the work state identifying unit identifies the first work state or the second work state based at least in part on a relationship between a position of the transport vehicle and a position of the work machine.

5. The construction site management device according to claim 4,
   wherein a plurality of transport vehicles and a single work machine are disposed at the construction site, and
   wherein the output control unit outputs the second time charts of the plurality of respective transport vehicles and the first time chart of the single work machine with a time axis as a common axis.

6. The construction site management device according to claim 3,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

7. The construction site management device according to claim 2,
  wherein the work state identifying unit identifies the first work state or the second work state based at least in part on the basis of a relationship between a position of the transport vehicle and a position of the work machine.

8. The construction site management device according to claim 7,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

9. The construction site management device according to claim 2,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

10. The construction site management device according to claim 1,
  wherein the work state identifying unit identifies the first work state or the second work state based at least in part on position data of the transport vehicle at each time point and a positional relationship with an earth cut location or a banking location.

11. The construction site management device according to claim 10,
  wherein the work state identifying unit identifies the first work state or the second work state based at least in part on a relationship between a position of the transport vehicle and a position of the work machine.

12. The construction site management device according to claim 11,
  wherein a plurality of transport vehicles and a single work machine are disposed at the construction site, and
  wherein the output control unit outputs time the second charts of the plurality of respective transport vehicles and the first time chart of the single work machine with a time axis as a common axis.

13. The construction site management device according to claim 10,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

14. The construction site management device according to claim 1,
  wherein the work state identifying unit identifies the first work state or the second work state based at least in part on a relationship between a position of the transport vehicle and a position of the work machine.

15. The construction site management device according to claim 14,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

16. The construction site management device according to claim 1,
  wherein a plurality of transport vehicles and a single work machine are disposed at the construction site, and
  wherein the output control unit outputs the second time charts of the plurality of respective transport vehicles and the first time chart of the single work machine with a time axis as a common axis.

17. A construction site management method comprising:
  identifying a first work state of a work machine disposed in a construction site at each time point during a target period and a second work state of a transport vehicle traveling at the construction site at each time point during the target period;
  generating a first time chart representing the first work state of the transport vehicle at each time point and a second time chart representing the second work state of the transport vehicle at each time point on the basis of the identified first and second work states; and
  outputting the first time chart representing the first work state of the work machine at each time point and the second time chart representing the second work state of the transport vehicle at each time point on an identical screen with a time axis as a common axis,
  wherein the first work state includes at least one of a type of work executed by the work machine; a location where the work machine is located; or a forward or a backward traveling direction of the work machine, and
  wherein the second work state includes at least one of a type of work executed by the transport vehicle; a location where the transport vehicle is located; or a forward or a backward traveling direction of the transport vehicle.

* * * * *